United States Patent
Cassidy et al.

(10) Patent No.: US 8,572,662 B2
(45) Date of Patent: Oct. 29, 2013

(54) METHOD OF PROVIDING CUSTOMIZED HOSPITALITY MEDIA FUNCTIONS AT A PLURALITY OF SET-TOP BOXES BEING CONNECTED TO AN RF COAX NETWORK, AND HOSPITALITY MEDIA SYSTEM THEREOF

(75) Inventors: Brendan Cassidy, Calgary (CA); Gary Court, Calgary (CA); Lindsey Carriere, Calgary (CA); Brian King, Calgary (CA); Darren Ziebart, Calgary (CA); Michael McCarthy, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 136 days.

(21) Appl. No.: 13/162,657

(22) Filed: Jun. 17, 2011

(65) Prior Publication Data

US 2011/0314492 A1 Dec. 22, 2011

(30) Foreign Application Priority Data

Jun. 18, 2010 (CA) .................................. 2706103

(51) Int. Cl.
*H04N 7/18* (2006.01)
*H04N 7/173* (2011.01)
*H04N 7/16* (2011.01)

(52) U.S. Cl.
USPC ............. 725/85; 725/132; 725/140; 725/152

(58) Field of Classification Search
USPC .................. 725/30, 74, 78–83, 85, 131–132, 725/139–140, 151–152
See application file for complete search history.

(56) References Cited

U.S. PATENT DOCUMENTS

| | | | |
|---|---|---|---|
| 5,661,517 A * | 8/1997 | Budow et al. ................... 725/82 |
| 2003/0041336 A1* | 2/2003 | Del Sordo et al. ............ 725/140 |
| 2003/0234819 A1* | 12/2003 | Daly et al. ..................... 345/810 |
| 2004/0172652 A1* | 9/2004 | Fisk et al. ....................... 725/82 |
| 2004/0187151 A1* | 9/2004 | Dunstan ........................ 725/133 |
| 2005/0144642 A1* | 6/2005 | Ratterman ...................... 725/86 |
| 2005/0183112 A1* | 8/2005 | Duval ............................. 725/31 |
| 2006/0117346 A1* | 6/2006 | Jo et al. .......................... 725/38 |
| 2007/0038570 A1* | 2/2007 | Halbritter et al. .............. 705/50 |
| 2007/0157251 A1 | 7/2007 | Shrivastava et al. ........... 725/60 |
| 2008/0059997 A1 | 3/2008 | Plotnick et al. ................ 725/32 |
| 2008/0163286 A1* | 7/2008 | Rudolph et al. ................ 725/28 |
| 2008/0215441 A1* | 9/2008 | Bruggemeier et al. .......... 705/1 |
| 2009/0119698 A1* | 5/2009 | Kuijlaars ....................... 725/25 |
| 2010/0057501 A1* | 3/2010 | Mohammed ..................... 705/5 |
| 2010/0259382 A1* | 10/2010 | Bruggemeier et al. ....... 340/541 |
| 2011/0099598 A1 | 4/2011 | Shin et al. ..................... 725/116 |

OTHER PUBLICATIONS

Enseo, "Galileo RF Firmware / Clone Setting Server", undated, downloaded from http://www.enseo.com/galilco.html on Apr. 15, 2010.

* cited by examiner

*Primary Examiner* — Pankaj Kumar
*Assistant Examiner* — Randy Flynn
(74) *Attorney, Agent, or Firm* — Andrew T. MacMillan

(57) ABSTRACT

A hospitality media system includes a plurality of set-top boxes (STBs) coupled to a radio frequency (RF) coax network. Each STB has an identifier for identifying the STB. A content source broadcasts media content to the STBs utilizing the RF coax network and an update server distributes software data to the STBs. The software data causes a particular STB to perform a media function customized for the particular STB according to the identifier of the particular STB.

20 Claims, 6 Drawing Sheets

| Channel | 7AM | 7:30AM | 8:00AM | 8:30AM | 300 |
|---|---|---|---|---|---|
| 40 | Morning News | | Weather | Sports | |
| 41 | Talk show | | Feature Movie | | |
| 42 | Cartoons | | | | |
| 43 | Paid advertisement | | | | |
| 44 | Financial report | | Stock showdown | | |

⟩ Updated IPG metadata broadcast to STBs at next time period

| Channel | 9:00AM | 9:30AM | 10:00AM | 10:30AM | 302 |
|---|---|---|---|---|---|
| 40 | World News | | Vacation | Sports | |
| 41 | Feature movie (cont'd) | | | Comedy | |
| 42 | Children's programing | | | Drawing | |
| 43 | Paid advertisement (cont'd) | | | Health | |
| 44 | Market Wrap | | Energy Outlook | | |

FIG. 3

| Room Identifier | Set of channels for IPG | Playable Channels |
|---|---|---|
| Room 301 | 1-30 | 1-20 |
| Room 302 | 1-60 | 1-20, 31-50 |
| Room 303 | 1-30 | 1-20, 24 |
| Room 304 | 1-30 | 1-20 |
| Room 306 | 1-60 | 1-20, 31-50, 24, 55 |

Updated channel list metadata broadcast to STBs after Room 301 orders channel 21

| Room Identifier | Set of channels for IPG | Playable Channels |
|---|---|---|
| Room 301 | 1-30 | 1-20, 21 |
| Room 302 | 1-60 | 1-20, 31-50 |
| Room 303 | 1-30 | 1-20, 24 |
| Room 304 | 1-30 | 1-20 |
| Room 306 | 1-60 | 1-20, 31-50, 24, 55 |

FIG. 4

METHOD OF PROVIDING CUSTOMIZED HOSPITALITY MEDIA FUNCTIONS AT A PLURALITY OF SET-TOP BOXES BEING CONNECTED TO AN RF COAX NETWORK, AND HOSPITALITY MEDIA SYSTEM THEREOF

CROSS-REFERENCE TO RELATED APPLICATIONS

This application claims the benefit of Canadian Patent Application No. 2,706,103 filed Jun. 18, 2010 which is incorporated herein by reference.

BACKGROUND OF THE INVENTION

The invention pertains generally to hospitality media and entertainment systems. More specifically, the invention relates to providing customized media functions at a plurality of set-top boxes being connected to a radio frequency coax network in a hospitality media system.

Older hotels that were not originally equipped with high-speed computer networks are under increased pressure to install such networks in order to meet guest expectations by providing an advanced digital media experience in the individual rooms. For example, customizable user-interfaces (UIs), pay-per-view content, video-on-demand (VOD) content, and interactive program guides (IPGs) are some examples of advanced features that are expected by guests. However, for hotels that were not originally designed to accommodate a high-speed internet protocol (IP) network, the costs of installing a complete wired IP solution are often prohibitive. Additionally, it may not be possible, or may not be desirable to install a complete wired IP solution due to historical or architectural reasons.

Installing a wireless network with speeds and bandwidth sufficient for transferring large files to multiple users may be an available solution in the future; however, current wireless technology is unable to reliably handle the huge bandwidth requirements of high definition multimedia content desired by guests without using large numbers of access points distributed throughout the hotel property. These access points themselves require wired connections to a content server and must be physically installed in multiple locations to provide strong signal strengths in all guest rooms and other locations where high speed media access is required. Because each guest may utilize the full capacity of a single access point, it may be that each and every room requires its own access point. Additionally, frequency allocation will need to be considered to avoid interference between access points. Therefore, the original problem of substantial installation and equipment costs is again encountered.

BRIEF SUMMARY OF THE INVENTION

According to an exemplary configuration of the invention there is provided a method of providing customized media functions in a hospitality media system. A plurality of set-top boxes (STBs) are coupled to a radio frequency (RF) coax network, each STB having an identifier for identifying the STB. Media content is broadcast from a content source to the STBs utilizing the RF coax network, and software data is distributed from an update server to the STBs. The software data is utilized at a particular STB to perform a media function customized for the particular STB according to the identifier of the particular STB.

According to another exemplary configuration of the invention there is provided a hospitality media system. Included is a plurality of set-top boxes (STBs) for coupling to a radio frequency (RF) coax network, each STB having an identifier for identifying the STB. A content source broadcasts media content to the STBs utilizing the RF coax network, and an update server distributes software data to the STBs. The software data causes a particular STB to perform a media function customized for the particular STB according to the identifier of the particular STB.

According to yet another exemplary configuration of the invention there is provided a hospitality media system including a plurality of set-top boxes (STBs) for coupling to a radio frequency (RF) coax network, each STB being pre-programmed with an identifier. Included is means for broadcasting media content to the STBs utilizing the RF coax network, and means for broadcasting software data to the STBs utilizing the RE coax network. The software data includes a module associated with a target identifier, and the module is only activated by one or more target STBs being pre-programmed with the target identifier.

These and other embodiments and advantages of the invention will become apparent from the following detailed description, taken in conjunction with the accompanying drawings, illustrating by way of example the principles of the invention.

BRIEF DESCRIPTION OF THE DRAWINGS

The invention will be described in greater detail with reference to the accompanying drawings which represent preferred embodiments thereof, wherein:

FIG. 3 illustrates first interactive program guide metadata of a previous time period being updated to second interactive program guide metadata for a next time period according to one configuration of the invention.

FIG. 4 illustrates dynamically updating in-real time the interactive program guide and playable channel lists specified in modules of FIG. 2 when a guest orders content-on-demand according to one configuration.

DETAILED DESCRIPTION

Figure 1:
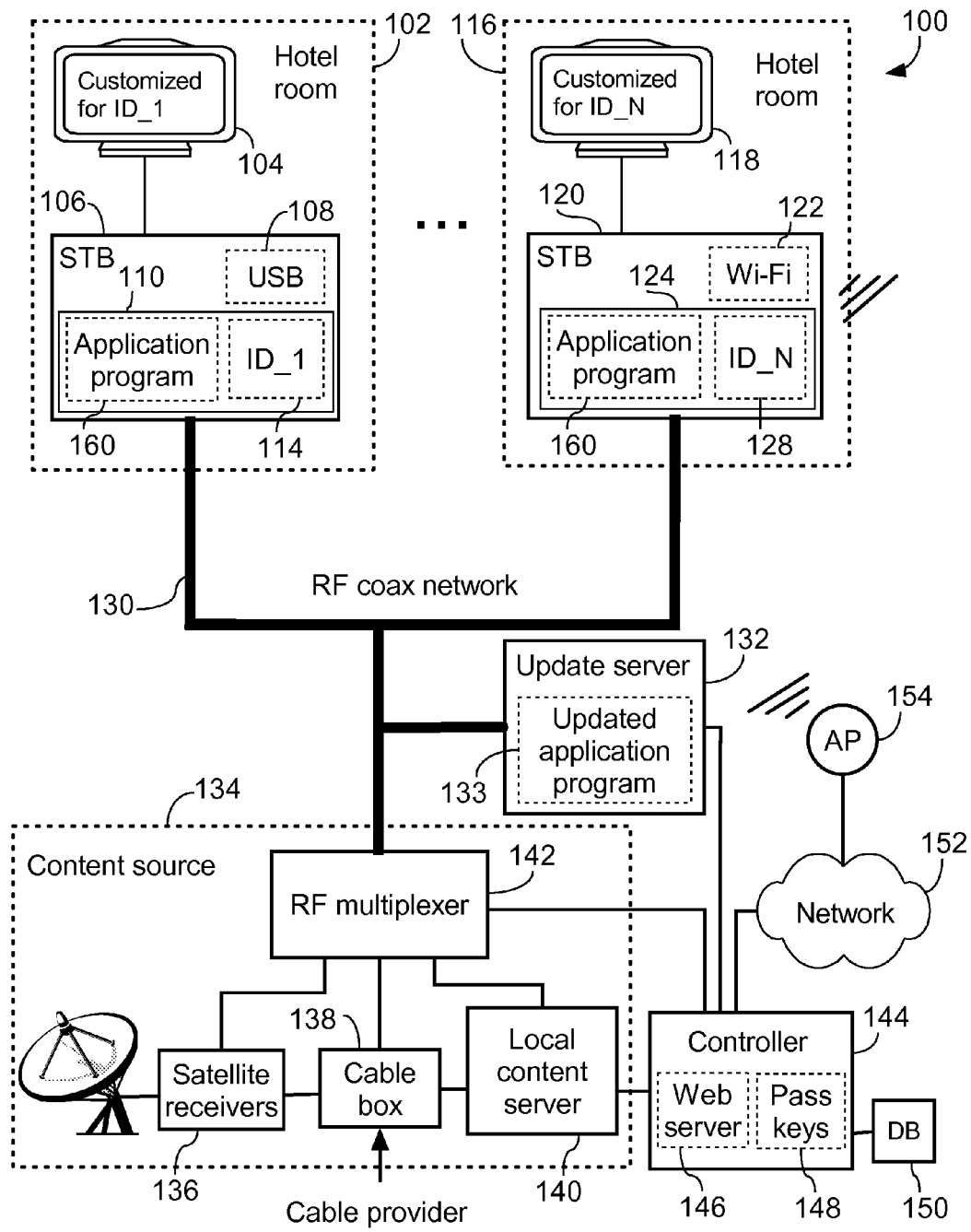
FIG. 1 illustrates a hotel media system for providing customized media functions at a plurality of set-top boxes installed in hotel guest rooms according to one configuration of the invention.

FIG. 1 illustrates a hotel media system 100 for providing customized media functions at a plurality of set-top boxes (STBs) 106, 120 according to an exemplary configuration of the invention. As shown, the hotel media system 100 includes a radio frequency (RF) coax network 130. RF coax networks 130 are typically available in older hotels that are not equipped with high-speed computer networks and are normally utilized to provide a one-way RF signal for broadcasting analog cable television channels to hotel rooms. One aspect of this configuration of the invention is to use the existing RF coax cable network 130 to broadcast to the STBs 106, 120 both media content and an application program 160 to thereby create a customized guest experience at each STB 106, 120. In one configuration, each STB 106, 120 has a unique identifier 114, 128 such as a room identifier being pre-programmed in a non-volatile memory 110, 124 during an installation process. In other configurations the identifiers 114, 128 may be the same in groups of STBs and/or may be dynamically programmed during media system 100 operation rather than pre-programmed at installation. Also, more than one identifier 114, 128 may be included in each STB 106, 120 such as including both a room number identifier and a service level identifier.

When at least one STB 106, 120 needs to be updated (for reasons that will be explained below), an updated application program 133 is broadcast by an update server 132 to all the STBs 106, 120 using the RF coax network 130. When detecting an updated application program 133 broadcast by the update server 132, each STB 106, 120 replaces the application program 160 in the non-volatile memory 110, 124 with the updated application program 133 received from the update server 132. Although all STBs 106, 120 may install and execute the same application program 160, the application program 160 behaves differently on STBs 106, 120 having different identifiers 114, 128. For example, as shown in FIG. 1, television 104 displays a video function being customized according the first identifier 114, and television 118 displays a video function being customized according the second identifier 128. This is also beneficial because the equipment types utilized in the rooms 102, 116 need not be the same. For example, as shown in FIG. 1, STB 106 includes a universal serial bus (USB) 108 while STB 120 includes Wi-Fi 122. As will be further explained in the following sections, the application program 160 correctly controls the USB 108 and the Wi-Fi 122 according to the identifiers 114, 128.

To briefly describe other features illustrated in FIG. 1, a content source 134 includes content providing systems such satellite receivers 136, a local media content server 140, and/or a cable television box 138. Other forms of content providing systems could also be included such as internet service provider (ISP) connections, radio receivers, video cassette systems, compact disc (CD) players, digital versatile disc (DVD) players, etc. Installation of the content source 134 is not cost intensive and can usually be located out of sight in a closet or a basement location of the hotel. Additionally, a controller 144 having a web server 146 and a passkeys module 148 may also be installed in the hotel or could be installed at a remote location accessible through a network such as the Internet.

The controller 144 is coupled to each of the content providing systems 136, 138, 140 in the content source 134 and to an RF multiplexer 142 to thereby allow the controller 144 to dynamically select and control media content to be broadcast to the STBs 106, 120 via the RF coax network 130. The controller 144 also generates the updated application program 133 according to configuration information that is stored in a database 150 and possibly according to selections made on the web server 146 by guests or hotel staff. The guests and hotel staff may access the web server 146 using a hotel or external network 152 having a wireless access point 154. Because the bandwidth intensive media content is broadcast to the STBs 106, 120 using the RF coax network 130, the wireless access point 154 only needs to provide low-speed, low-bandwidth connectivity for accessing the web server 146. Therefore, no significant installation costs are encountered from installing the wireless access point 154. Other methods of accessing the controller 144 such as wired and wireless connections or other types of networks are also possible in other configurations.

As shown in FIG. 1, the update server 132 is coupled to the RF coax network 130 and the controller 144 for broadcasting the updated application program 133 to the STBs 106, 120 throughout the hotel using the RF coax network 130. As will be explained, in other configurations, the update server 132 may also distribute the updated application program 133 to the STBs 106, 120 using either broadcasting or other methods.

Figure 2:
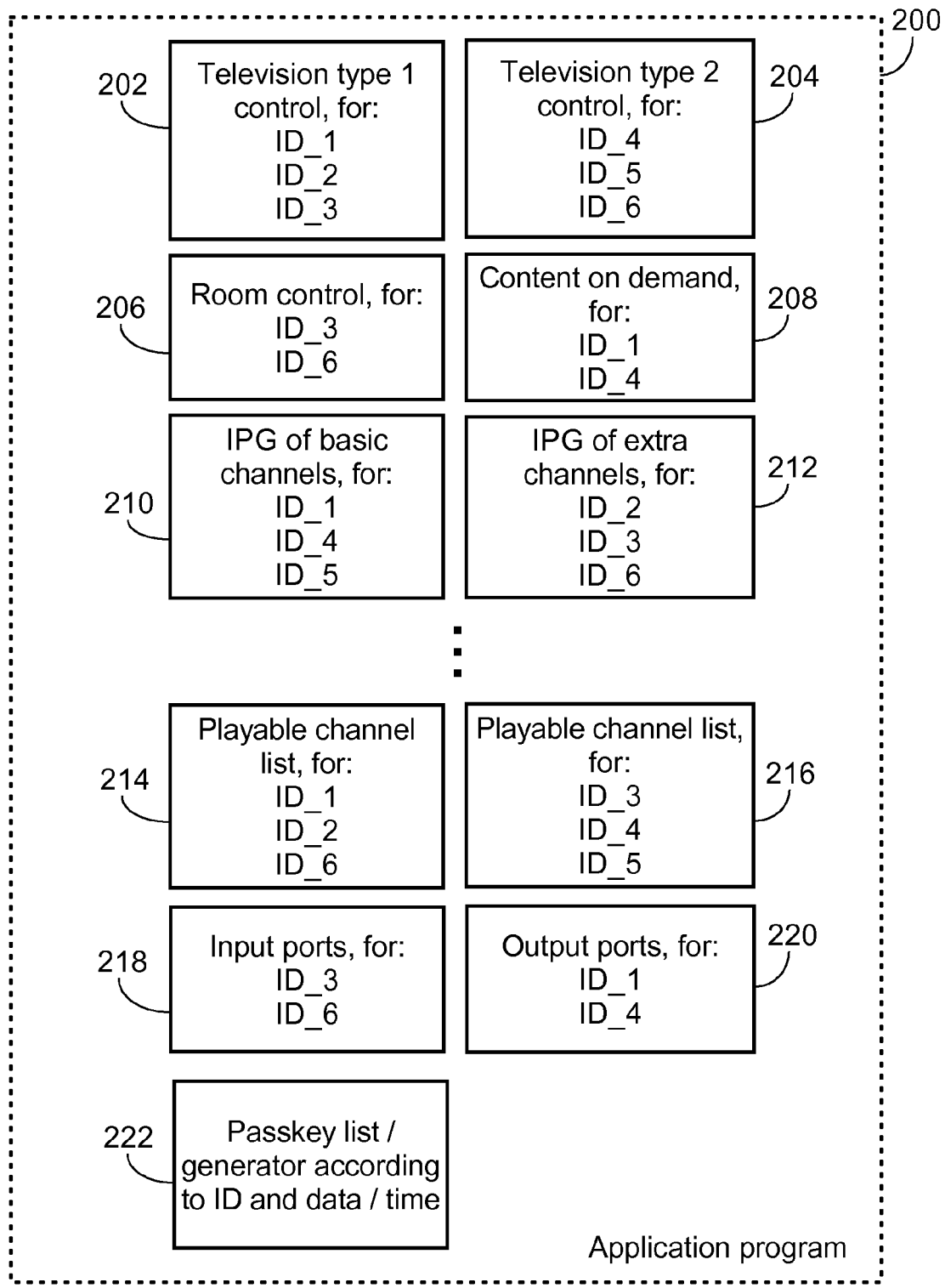
FIG. 2 illustrates one configuration of an application program having modules each being associated with one or more target identifier(s) for performing media functions at a set-top box having a matching identifier according to one configuration of the invention.

FIG. 2 illustrates an exemplary configuration of software data such as an application program 200 having modules 202, 204, 206, 208, 210, 212, 214, 216, 218, 220, 222 each being associated with one or more target identifier(s) for performing media functions at a STB having a matching identifier according to one configuration of the invention. In one configuration, each module corresponds to a different media function. As shown in FIG. 2, the application program 200 may perform any number of media functions, each being targeted at and customized for any particular STB identifier(s). For example, a first television controller module 202 may be included to allow STBs having target identifiers ID_1, ID_2, ID_3, for example, to control an attached television of a first type. A second television controller module 204 may be included to allow STBs having target identifiers ID_4, ID_5, ID_6, for example, to control an attached television of a second type. Having different television type modules 202, 204 is useful because each television manufacture and television model may require a specific set of control commands or a specific control protocol be followed by a controlling STB 106, 120. Therefore, the television controlling modules 202, 204 being targeted to the specific identifiers of corresponding STBs 106, 120 allows different television types to be utilized with the hotel media system 100.

Other equipment type modules could also be included in the application program 200 and targeted toward any types of equipment, such as different types of STBs 106, 120, personal video recorders, projectors, audio systems, etc. In these configurations, the identifier 114, 128 stored in each STB 106, 120 may correspond to a type of equipment used in conjunction with the STB 106, 120. The database 150 shown in FIG. 1 may include this information to allow the media system 100 to keep track of which STB identifiers 114, 128 correspond to which television control modules 202, 204. For example, if a new television 104, 118 is installed in a particular room 102, 116, the database 150 may be correspondingly updated and the controller 144 may automatically generate an updated application program 133 to be distributed to the STBs 106, 120 by the update server 132. In this way, software data (e.g., the updated application program 133) is broadcast by the update server 132 to the STBs 106, 120 utilizing the RF coax network 130, and the software data includes a module associated with a target identifier that matches the identifier of the STB in the room with the new television. As this module is only activated by the one or more target STBs being pre-programmed with the target identifier, only the functionality of the STB in the room with the new television is affected even though all STBs 106, 120 may receive and install the updated application program 133.

In another example, the application program 200 includes room control module 206 being targeted at STBs having the exemplary identifiers ID_3 and ID_6. Room control may involve controlling aspects of the hotel room 102, 116 such as the windows, blinds, air conditioner, heater, lights, fans, door locks, etc. As only some rooms may be equipped with room control functions, in this example, room control module 206 is activated only on STBs having target identifiers ID_3 and ID_6 by comparing the target identifiers ID_3 and ID_6 with the identifier on each STB 106, 120. Therefore, the identifiers 114, 128 may again correspond to an equipment type (i.e., type of room control) and identify each STB 106, 120 in terms of which type of equipment is connected to each STB 106, 120.

Alternatively, only some rooms 102, 116 may be entitled to utilize room control functions and therefore module 206 will only be activated in these rooms. In this configuration, the identifier 114, 128 may correspond to a level of service indicating which STBs 106, 120 may utilize the room control module 206. As room control authorizations are changed in the database 150, the controller 144 may generate an updated application program 133 having updated target IDs for the room control module 206. The update server 132 then broadcasts the updated application program 133 to the STBs 106, 120 using the RF coax network 130. Changes in the room control authorizations may be made automatically according to reservations or a hotel property management system (PMS), for example, or be made manually by hotel staff utilizing the web server 146.

Interactive program guide (IPG) modules 210, 212 include metadata utilized to generate an IPG on the STBs 106, 120 according to the particular set of channels that are available at each STB 106, 120. In this example, there are two channel sets available: a basic channel package having the channels described in IPG module 210, and an enhanced channel package having the channels described in IPG module 212. According to the continuously changing channel content, the controller 144 may periodically generate an updated application program 133 having current metadata for generating the IPG for each set of the media content customized on each STB 106, 120 by the identifier 114, 128 of each STB 106, 120. The update server 132 then broadcasts the updated application program 133 to each STB 106, 120 utilizing the RF coax network 130.

FIG. 3 illustrates first IPG metadata 300 of a previous time period being updated to second IPG metadata 302 for a next time period according to an exemplary configuration of the invention. In different configurations, the updated IPG metadata 302 may be periodically broadcast to all STBs 106, 120 every few hours, once per day, or dynamically when a change in channel scheduling or availability occurs.

The application program 200 in FIG. 2 also includes exemplary playable channel list modules 214, 216 to specify which channels of the media content sent on the RF coax network 130 are authorized to be played by each STB 106, 120. In this example, there are two channel sets available: a first channel package having the playable channels described in module 214, and a second channel package having the playable channels described in module 216. Additional channel list modules may also be included as required. For example, if a particular STB is now authorized to view an additional channel, an additional channel list module targeted at the identifier of the particular STB may be included. This change in authorized channels could occur when a guest associated with the particular STB orders content-on-demand such as pay-per-view or video-on-demand (VOD). When the change in authorized channels occurs, the controller 144 may dynamically generate an updated application program 133 in real-time, the updated application program 133 having new playable channel lists for each STB 106, 120 according to the identifier of each STB 106, 120. The update server 132 may then broadcast the updated application program 133 to each STB 106, 120. Alternatively, in another configuration, passkeys may be utilized to avoid the need to send out an immediately updated application program 133.

FIG. 4 illustrates dynamically updating in-real time the IPG and playable channel lists specified in modules 210, 212, 214, 216 of FIG. 2 when a guest orders content-on-demand. A guest may place an order for content-on-demand by accessing the web server 146 through the wireless access point 154. Alternatively, a hotel staff member may place the order for the guest. If billing for the content-on-demand order is required, the web server 146 may additionally bill the guest by adding a charge to the guest's room 102, 116 in the hotel PMS (possibly also integrated with database 150) or by directly charging the guest's credit card.

As shown in FIG. 4, in this example, the STB identifiers 114, 128 are room identifiers that identify each STB 106, 120 by indicating the room 102, 116 in which each STB 106, 120 is located. According to the level of service for which each room is entitled, the channels of IPG modules 210, 212 are broken into two sets: the basic channels 1-30, and the enhanced channels 1-60. For example, the IPG available in "room 301" will only include the set of channels 1-30, while the IPG in "room 302" will include the set of channels 1-60. It should also be noted that the channels may be available from any combination of the content systems 136, 138, 140 available in the content source 134. Additionally, by default, not all channels listed on the IPG may be authorized to be played at each STB 106, 120. Instead, each room has a customized list of playable channels (labeled "Playable Channels" in FIG. 4). For example, some rooms 102, 116 may be able to play more channels than other rooms 102, 116 due to being entitled to a higher service level or due to having purchased content-on-demand.

In this example, a first set of metadata 400 is replaced with an updated set of metadata 402 after "room 301" orders channel 21. The update server 132 then broadcasts the updated set of metadata 402 to all STBs 106, 120 utilizing the RF coax network 130. Each STB 106, 120 thereafter utilizes the updated set of metadata 402 to generate the IPG and to determine which channels are authorized for playback. For example, the controller 144 may generate an updated application program 133 including the updated set of metadata 402 upon confirming the order from "room 301". The update server 132 then broadcasts the updated application program to all STBs 106, 120. The STB having the "room 301" identifier is thereby authorized to view channel 21. In another configuration, only the updated set of metadata 402 may be broadcast without broadcasting the full application program 200.

The application program 200 in FIG. 2 also includes an exemplary content-on-demand module 208 being targeted at STBs having the identifiers ID_1 and ID_4. The content-on-demand module 208 may include metadata such as advertisement text, graphics, video clips, and menus to promote pay-per-view, video-on-demand (VOD), and pay-use content available on the hotel media system 100. Because not all rooms may be allowed to utilize content-on-demand, in this example, the module 208 is targeted only at authorized target identifiers ID_1 and ID_4. Additionally, as the content-on-demand authorized to be played in each room 102, 116 may not necessarily be the same, a plurality of different content-on-demand modules 208 may be included in the application program 200, each targeting different STBs 106, 120 with the appropriate content.

Upon changes in the available content-on-demand or changes in authorization for which STBs may utilize content-on-demand in the database 150, the controller 144 may generate an updated application program 133 having updated content-on-demand metadata and target identifiers for the content-on-demand module 208. The update server 132 then broadcasts this software data to each STB 106, 120 using the RF coax network 130. Additionally, if a particular STB 106, 120 is authorized to play a particular pay-per-view channel or VOD movie, the content-on-demand module 208 may automatically cause the particular STB to change to the appropriate RF media channel and play the pay-per-view channel or VOD movie.

Figure 5:
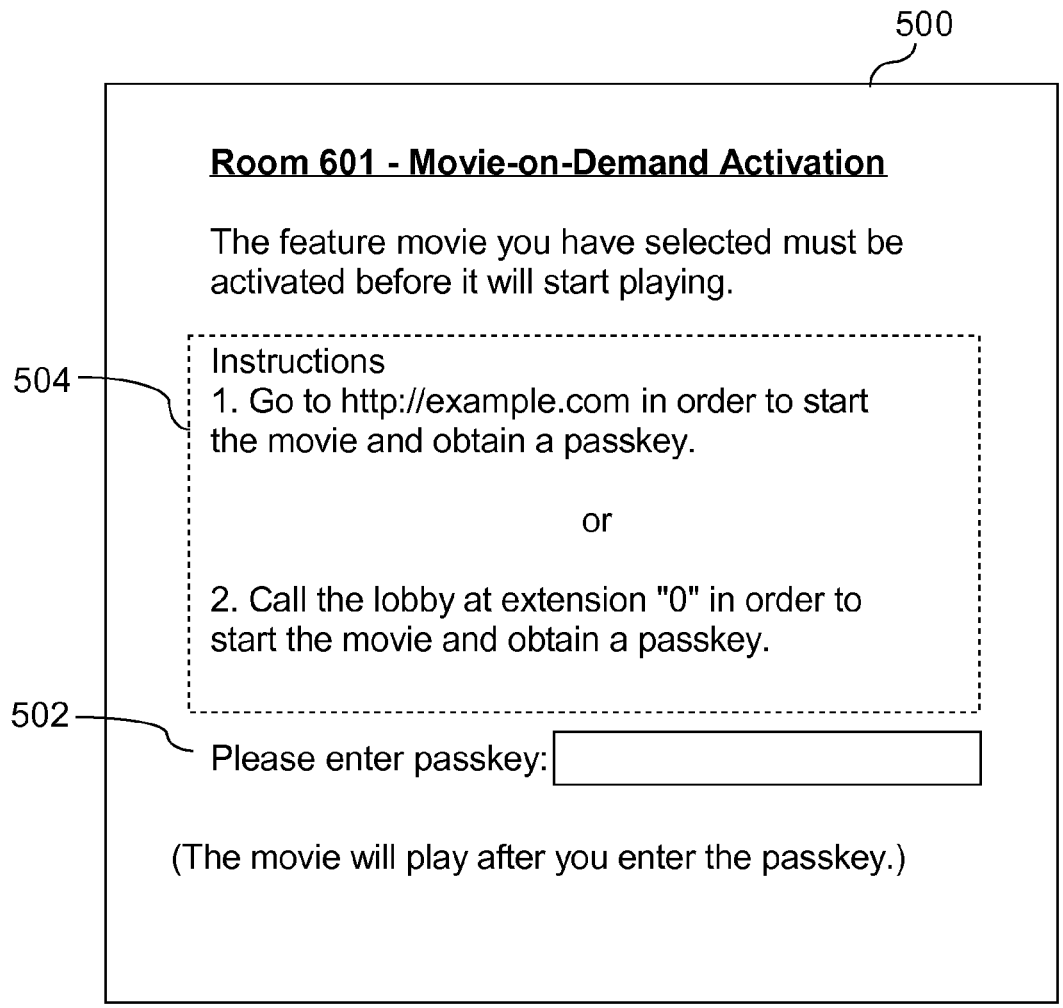
FIG. 5 illustrates a user interface on a particular set-top box for activating playback of content-on-demand using a passkey obtained from the web server of FIG. 1 according to another configuration.

FIG. 5 illustrates a UI 500 on a particular STB 106, 120 allowing a user to activate playback of content-on-demand using a passkey obtained from the web server 146 according to another configuration of the invention. Using passkeys may be beneficial for some media systems 100. One reason is to avoid the need to send out in real-time an updated application program 133 each time content-on-demand is order by a guest. In some situations, it may not be possible to perform real-time updating of the application program 160 in each STB 106, 120 due to hardware limitations of the STB 106, 120 or other reasons. For example, in order to avoid disrupting guests, the STBs 106, 120 may be limited to only install the updated application program 133 received from the update server 132 when the STB 106, 120 is powered off or in a standby mode. Therefore, in these situations, updates may typically only be installed at night or when the STB 106, 120 is otherwise not in use by a guest.

To allow customized and dynamic content-on-demand media functions with STBs 106, 120 so constrained, in one configuration, when a guest attempts to activate content-on-demand such as a starting a pay-per-view subscription to a certain channel or activating a video-on-demand on a particular STB 106, 120, a passkey module 222 of the application program 200 may be utilized to query the guest for a first passkey (query 502 in FIG. 5). Instructions 504 may describe various options for how the guest may obtain the passkey. The passkey module 222 then compares the first passkey entered at query 502 with a second passkey being specified by the passkey module 222 according to the identifier 114, 128 of the particular STB 106, 120. Assuming the password entered at query 502 matches a password specified by the passkey module 222, the guest is deemed to be authorized to watch the corresponding video-on-demand channel utilizing the particular STB 106, 120. The particular STB 106, 120 may then automatically switch to the correct channels in order to play the movie. If the first passkey entered at query 502 does not match a password specified by the passkey module 222, the particular STB 106, 120 may issue a helpful error message to the user.

In one configuration, the passkey module 222 may include a plurality of second passkeys 148 as pre-generated by the controller 148 and included in the updated application program 133, which is installed as the application program 160 in each STB 106, 120. Each of the passkeys 148 may be for a different media function and be associated with a target STB identifier 114, 128. For example, different passkeys for each STB may be associated with playing predetermined channels for predetermined time durations, or to switch to predetermined service levels, etc.

In another configuration, the passkey module 222 includes an algorithm that specifies the second passkey by causing the second passkey to be generated by the particular STB 106, 120. In order to prevent guests in different rooms from being able to use the same passkeys and to avoid a guest in a same room reusing a same passkey multiple times, the algorithm in the passkey module 222 may generate the passkeys for each media function according to the identifier of the particular STB and the current time. The current time may be kept substantially the same throughout the media system 100, for example by the update server 132 broadcasting the time to the STBs 106, 120 utilizing the RF coax network, and may include any resolution of the current time including year, month, day, hour, minute, etc. The controller 144 may utilize the same algorithm as the passkey module 222 to generate the passkeys 148, as required. Passkeys may be valid for a window of time such as 10 minutes and then new ones would be generated by the algorithm.

By using an algorithm to generate the passkeys 148, 222 according to STB identifiers 114, 128 and a current time, continuously changing passkeys are automatically utilized by the media system 100 without requiring a frequently updated application program 133 to be distributed to the STBs 106, 120. An additional benefit of broadcasting the time to the STBs 106, 120 utilizing the RF coax network is that time sensitive information such as a list of television programs currently available and displayed to the user as an IPG will be correct without requiring hotel technicians to manually set and maintain the time on each STB 106, 120. In this way, the time on all STBs 106, 120 in all rooms of the hotel will be automatically set to the correct time when the internal clock of a STB 106, 120 drifts, after seasonal time changes, and/or when a faulty STB is replaced, for example. This reduces administration costs, especially in a hotel having hundreds of guest rooms that are typically occupied by guests and therefore inconvenient for technicians to enter.

After the guest (or staff member) orders content-on-demand utilizing the web server 146, the controller 144 may, if required, activate the playback of the desired content from the content source 134. For example, the controller 144 may start playback of a desired feature movie stored within the local content server 140 and select an available RF channel of the RF coax network 130 using the RF multiplexer 142. To give the guest time to finish the authorization process, a predetermined delay of a few minutes before starting playback may be included.

As the controller 144 activates the desired content on the available RF channel, the web server 146 issues the guest (or the staff member etc) one of the passkeys 148 that authorizes the particular STB 106, 120 associated with the guest (targeted by the identifier 114, 128) to view the available channel. Note that for other pay-per-view content, the content may already be in progress so the controller would not need to start the playback. The guest enters the first passkey received from the web server 146 at query 502, and the guest's STB 106, 120 determines a corresponding second passkey as specified by the passkey module 222 according to the identifier 114, 128 in order to confirm that the guest is authorized to watch the content and also to determine on which channel of the RF coax network 130 the content is being played. The passkey issued by the web server 148 may allow the guest to play the desired channel (or perform any other customized media function) for a designated time period such as one hour, two hours, one day, until checkout, etc.

As shown in FIG. 1, STB 120 includes Wi-Fi 122. Therefore, in another configuration, STB 120 may be configured by the content-on-demand module 208 to directly interact with the controller 144 utilizing the hotel's wireless network access point 154. In this configuration, because a back channel is available for the STB 120 to communicate information to the controller 144, content-on-demand may occur automatically without the need for either passkeys or real-time updates of the application program 160. In fact, content-on-demand functions may also be performed over any type of available back channel, including IP over the RF coax network 130, WLAN, telephone connection, or other wired and wireless connections.

FIG. 2 also illustrates input and output port modules 218, 220, which respectively specify which input and output ports may be utilized on each STB 106, 120. For example, some STBs (e.g., identifiers ID_3, ID_6) may be authorized via the input port module 218 to receive additional media content or guest content from certain input ports such as such as universal serial bus (USB), FireWire, Ethernet, etc or wireless access ports such as using Bluetooth, Wi-Fi, WLAN. Likewise, some STBs (e.g., identifiers ID_1, ID_4) may be authorized to output media content or other data from certain output ports. For example, STB 106 may be configured to allow a guest to have input access via the on-board USB 108, and STB 120 may be configured to allow a guest to have both input/output access via the on-board Wi-Fi 122. Changes in input and output ports targeted at specific STB identifiers may be reflected in the updated application program 133 and broadcast to the STBs 106, 120 by the update server 132. Only the STBs having identifiers matching the targeted identifiers will activate the modules 218, 220 and make the changes to their input and output ports.

Figure 6:
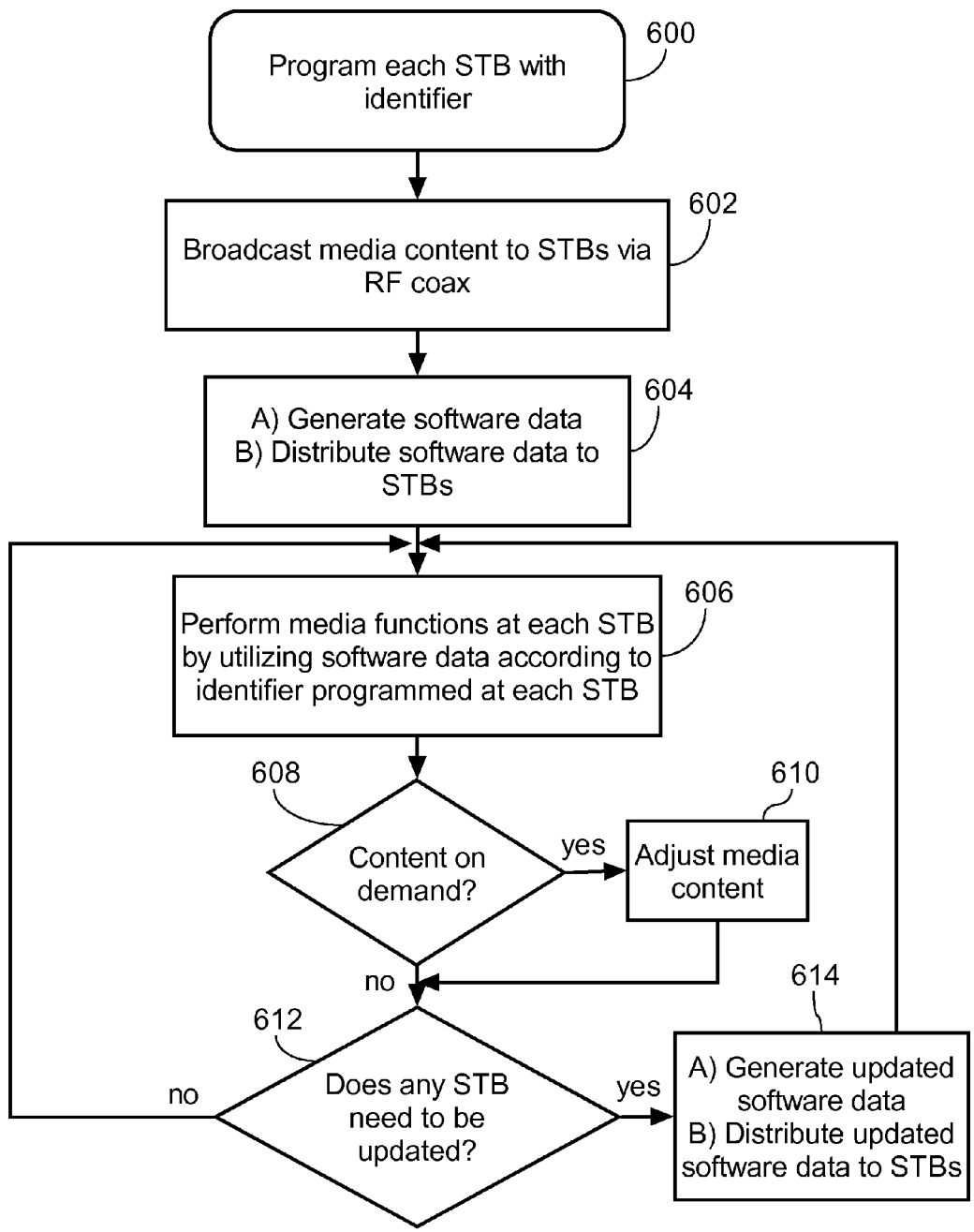
FIG. 6 illustrates an exemplary operational flowchart of operations performed by the hotel media system of FIG. 1.

FIG. 6 illustrates an exemplary operational flowchart of operations performed by the hotel media system 100 of FIG. 1. The steps of the flowchart are not restricted to the exact order shown, and, in other configurations, shown steps may be omitted or other intermediate steps added. In this configuration, the hotel media system 100 performs the following operations:

Step 600: A plurality of STBs 106, 120 connected to a radio frequency (RF) coax network is provided in the hospitality media system 100. Each STB 106, 120 has an identifier 114, 128 for identifying the STB such as a unique identifier being pre-programmed in a non-volatile memory 106, 120; an equipment identifier corresponding to a type of equipment utilized in conjunction with each STB 106, 120; a room identifier corresponding to a room 102, 116 in which each STB 106, 120 is located; a service level identifier indicating a level of service entitled to each STB 106, 120, or another type of identifier.

Step 602: Media content is broadcast from a content source 134 to the STBs 106, 120 utilizing the RF coax network 130. The media content may be dynamically controlled by a controller 144 using an RF multiplexer 142 and a plurality of content providing systems 136, 138, 140. In order to prevent unauthorized access, the RF signal representing the media content may be encrypted.

Step 604: In part A of this step, the controller 144 generates software data such as the application program 160, 200 and/or metadata data 300, 400 being customized for each STB 106, 120 according to the identifiers 114, 128. A database 150 may be utilized to store configurations and other information used by the controller 144 when generating the software data 160, 200, 300, 400. In part B of this step, the update server 132 distributes the software data 160, 200, 300, 400 to the STBs 106, 120. In one configuration, the update sewer 132 broadcasts the software data 160, 200, 300, 400 to the STBs 106, 120 utilizing the RF coax network 130. In other configurations, other types of distribution may be utilized. For example, as shown in FIG. 1, the update server 132 may distribute the software data 160, 200, 300, 400 using the wireless access point 154, and STB 120 may receive the software data from the wireless access point 154 utilizing Wi-Fi 122. In this configuration, STB 120 receives the high bandwidth media data from the RF coax network 130, but receives software data such as updated application program 133 and metadata 302, 402 through a secondary and lower bandwidth method such as a wireless internet network available in the hotel. In general, distributing the software data to the STBs 106, 120 may be performed over any type of distribution system such as over the RF coax network 130, WLAN, telephone connection, or other wired and wireless connections.

Step 606: Media functions are performed at each STB 106, 120 by utilizing the software data 160, 200, 300, 400 according to the identifier 114, 128 programmed at each STB. Due to the different identifiers 114, 128, the software data 160, 200, 300, 400 causes different behavior on STBs 106, 120 having different identifiers 114, 128. In other words, the software data may cause a particular STB 106, 120 to perform a media function customized for the particular STB 106, 120 according to the identifier 114, 128 of the particular STB 106, 120. This may done by including in the software data a first module associated with a target identifier, where the first module is only activated (e.g., used) by one or more target STBs 106, 120 being pre-programmed with the target identifier. Alternatively, a second module may be associated with certain STB identifiers 114, 128 to exclude. In this case, STBs 106, 120 having matching identifiers 114, 128 will ignore the second module and all other STBs 106, 120 not having the matching identifiers 114, 128 will activate the second module. In yet another example, a third module may be associated with a range of STB identifiers 114, 128 to either target or exclude. Modules may also target or exclude combinations of multiple identifiers on each STB 106, 120. This allows customizing media functions for different STBs such as all STBs that have a service level identifier matching a first value and an equipment type identifier matching a second value. Combinations of these techniques may also be employed.

Step 608: If content-on-demand is ordered, control proceeds to step 610; otherwise, control proceeds to step 612. For example, content-on-demand may be ordered by a guest or hotel staff member utilizing the web server 146.

Step 610: To start the desired content, the controller 144 activates playback of the desired content at the content source 134 on an available channel of the RF coax network 130 using the RF multiplexer 142.

Step 612: If any STB 106, 120 needs to be updated, control proceeds to 614; otherwise, control returns to step 606. Some examples of situations when a STB 106, 120 may need to be updated include: after ordering content-on-demand at step 610, in order to provide new IPG metadata (FIG. 3) or channel list metadata (FIG. 4), to accommodate equipment type changes, to customize the UI for a particular guest in a particular room 102, 116, to change identifiers of any STB (such as upgrading a particular STB to a higher service level), to send announcements or messages to one or more rooms, to update a particular in-room STB when a guest checks in or out of a room, etc.

Step 614: In part A of this step, the controller 144 generates updated software data such as the updated application program 133 and/or updated metadata data 302, 402 being customized for each STB 106, 120 according to the identifiers 114, 128. In part B of this step, the update server 132 distributes the updated software data 133, 302, 402 to the STBs 106, 120 using the same methods as outlined above in step 604.

According to one configuration of the invention, guest rooms in a hotel are equipped with a STB 106, 120 that has a capability to receive updated software data 133, 302, 402 from an RF network 130 along with media content. The STB 106, 120 is configured to monitor the RE signal for the updated software data 133, 302, 402 and to install the updated software data 133, 302, 402 into its non-volatile memory 110, 120. Verification of integrity of the received software updates using checksums can be used to prevent corrupted code from being stored. The RF signal on the RF coax network 130 may be sent to all STBs 106, 120 but only STBs 106, 120 with a matching TV or Room identifier 114, 128 will utilize portions of the update. There are no adverse effects of sending all software packages to all STBs 106, 120. Only the STBs 106, 120 with matching identifiers 114, 128 would activate modules of the software update targeted at those identifiers allowing specific software modules to be used in specific rooms 102, 116 or locations. In other configurations, specific updated software data 133, 302, 402 may be distributed individually to specific rooms 102, 116 or locations in the hotel according to unique STB addresses/identifiers 114, 128. These configuration may be beneficial hotels having both a 1-way RF coax network 130 for providing media content to the STBs 106, 120 and a wireless IP based network coupled to each STB 106, 120 for providing software data to the STBs 106, 120.

Upon boot-up or reset, the STB 106, 120 loads and runs the application program 160 that was recently downloaded from the RF signal. The application program 160 allows the STB 106,120 to provide various media functions including a user interface (UI) for operation of the media platform such as a high definition television 104, 118 or an in-room high fidelity audio system. The UI may allow for user control such as volume operation, playback start/stop/pause etc. Elements such as the visual aspects of the UI are controlled by the software data 160 and can therefore be changed at any time. Any aspect of the UI can be changed by updating the application program 160 in the STBs 106, 120. For example, graphical screens, backgrounds, layout, sounds, animations, appearance of onscreen controls, etc. Certain modules in the application program 160 may be targeted at specific STB identifiers 114, 128 and are thus only activated when the application program 160 is run on STBs having the specific STB identifiers 114, 128.

The STBs 106, 120 also monitor the RF coax network 130 for an updated application program 133 that includes messages or instructions that are specific to that particular room. For example, messages could be sent from the hotel front desk via the coax cable network 130 for display on the television 104, 118. In addition to text, such messages could include audio and video components that would be played via the media platform in the particular rooms 102, 116. Playback may be initiated by the guest upon receiving a message notification such as a flashing icon or an audio signal.

The STBs 106, 120 also monitor the RF signal for data corresponding to updated metadata 302, 402 of media programs such as movies, concerts, and radio stations that are available to the guest. The application program 160 of the STB 106, 120 displays the updated metadata 302, 402 as an IPG that the user can navigate using a remote control, touch screen, or other control method. The metadata may be targeted at specific STB identifiers 114, 128 or may include information correlating STB identifiers 114, 128 with portions of the metadata. Upon selection of a desired media program, the application program 160 of the STB 106, 120 forwards the actual media content from the RF coax network 130 to other devices such as the television 104, 118 for playback. The media system 100 may also include personal video recorder (PVR) media functions to allow the user to pause, rewind, and fast forward the media content.

Content-on demand such as VOD and pay-per-use functionality may also be accommodated even though the RF coax cable network 130 may only support data communication in one direction (ie, from update server 132 to STBs 106, 120). In one configuration, the guest may simply dial a predefined hotel extension number on the phone which connects the guest with a touch-tone or voice operated system allowing the guest to enter a number corresponding to a movie s/he wishes to purchase. The touch tone system may reside on the control server 144 at the hotel, or may even be located at a remote site and accessible through a 1-800 number instead of a hotel extension. Using caller-id or a similar capability, the touch-tone media ordering system may detect the guest's room number automatically and accept the order and bill the room 102, 116. Alternately, instead of an automated touch tone system, the guest may simply call the front desk, an external service provider, or access a web server 146 to order a movie.

In another configuration, the STB 106, 120 may also be connected directly to the phone line in the hotel in order to allow two-way communication with the controller 144. In this configuration, the guest could interact with STB 106, 120 to order a content-on-demand, and the STB 106, 120 sends the request to the control server via the phone line. The STB 106, 120 may also include wireless capabilities 122 and be able to send data to the control server 144 through a wireless network access point 154 in the hotel that is provided to allow the guests to surf the Internet, for example. Again, the bandwidth of the wireless network access point 154 need not be sufficient to transfer the media information as this arrives via the RF coax cable network 130. In fact, any method that allows the guest to interact with the controller 144, either directly or indirectly, allows for VOD and other interactive content-on-demand media functions. For example, two-way data transfer may be implemented by in-room phone lines using asynchronous digital subscriber line (ADSL) or modems, wireless networks, electrical wires, the guest's own cell phone, or even using IP over the RF coax network 130.

A central configuration database 150 may be provided to allow hotel staff to configure the STBs 106, 120 and other equipment in the rooms 102, 116 via the RF coax cable network 130. Configuration aspects may include skins, color schemes, predefined settings such as channel line-ups, software versions and updates, etc. The central configuration database 150 may be implemented with a web server 146 that runs on the controller 144 or another server either local or remote to the hotel. Hotel staff or property owners interact with the configuration unit to push updates to one or more of the STBs 106, 120 or other pieces of in-room equipment. If two-way communications between the in-room equipment and the control server is enabled, monitoring of the STBs 106, 120 and other equipment may also be performed.

A one-way system in which software data is sent to the STBs or other in-room devices but the device cannot acknowledge receipt may raise maintenance concerns. These concerns can be overcome by adding a back channel to the system, making it a two-way system, as described in earlier sections. For example: phone line, wireless, or IP over coax. In another configuration, the STB 106, 120 or device may display versions of all relevant software modules and media information so a user can manually verify the information is correct and up to date. For example: when the user enters a special key sequence on the remote control the software module and media information including package and versioning information would be displayed on the TV screen.

In summary, a hospitality media system includes a plurality of set-top boxes (STBs) connected to an RF coax network. Each STB has an identifier for identifying the STB such as a room number, equipment type, or service level. A content source broadcasts media content to the STBs utilizing the RF coax network and an update server distributes software data to the STBs. The software data causes a particular STB to perform a media function customized for the particular STB according to the identifier of the particular STB. The update server may periodically distribute the software data to the STBs when at least one STB is required to be updated and may broadcast the software data to the STBs using the RF coax network. Updated software data or passkeys generated according to the STB identifiers may be used to support customized content-on-demand media functions for the particular STB.

In the above description, the exemplary user identifier "guest" includes current guests in the hotel, people who are attending a conference or meeting in the hotel, staff members at the hotel, or any other person or user who may need or want to utilize a hospitality media system. Future guests that have reservations, potential future guests that don't yet have reservations, and other users may also make use of the invention. For example, a demonstration of the technology may be available in the hotel lobby and all users would be able to try the system 100. The term "broadcasting" is intended to mean disseminating information (e.g., media content and/or updated software data) in a way such that all STBs 106, 120 may receive the same information. The term "distributing" is intended to include both broadcasting and also other methods of sending information to the STBs 106, 120 where not all STBs 106, 120 necessarily receive the same information. The term "set-top box" (STB) includes any device, whether standalone or integrated within another device, that performs a media function according to software data and that includes functionality for processing media content received via the RF coax network 130 for playback by a media device such as a television or audio system.

Although the invention has been described in connection with a preferred embodiment, it should be understood that various modifications, additions and alterations may be made to the invention by one skilled in the art without departing from the spirit and scope of the invention as defined in the appended claims. For example, although the description of the invention has been described as being utilized at a hotel, the invention is equally applicable to any hospitality related location or service wishing to provide users with a media system including but not limited to hotels, motels, resorts, hospitals, apartment/townhouse complexes, restaurants, retirement centers, cruise ships, busses, airlines, shopping centers, passenger trains, etc. Although, the software data has been illustrated including an application program having modules and metadata, other types of software data may also be utilized. For example, software data including configuration modules being targeted at specific STB identifiers may be distributed to the STBs 106, 120 in other configurations.

The various separate configurations, elements, features, and modules of the invention described above may be integrated or combined into single units. For example, a high definition television or other media platform that can receive media and data directly from a coax or other connection can be used instead of (or in addition to) a set top box. Similarly, functions of single units may be separated into multiple units. The various components may also be implemented as dedicated hardware or as one or more software programs executed by a general or specific purpose processor to cause the processor to operate pursuant to the software program to perform the above-described functions. For example, the controller 144 of FIG. 1 may be implemented by a computer server having one or more processors executing a computer program loaded from a storage media (not shown) to perform the above-described functions related to the controller 144. In addition to a dedicated physical computing device, the word "server" may also mean a service daemon on a single computer, virtual computer, or shared physical computer, for example. Unless otherwise specified, features described may be implemented in hardware or software according to different design requirements. Additionally, all combinations and permutations of the above described features and configurations may be utilized in conjunction with the invention.

What is claimed is:

1. A method of providing customized media functions in a hospitality media system having a plurality of set-top boxes (STBs) coupled to a radio frequency (RF) coax network of a hotel, wherein each of the STBs performs one or more media functions according to software data stored in a non-volatile memory of the STB, each of the STBs is programmed with an identifier stored in the STB's non-volatile memory for identifying the STB, and the identifier of each STB: is changeable, is programmed into the STB when the STB is installed in a room of the hotel, and identifies the STB according to a characteristic of the room of the hotel in which the STB is installed, the method comprising:

tracking desired functionality for each of the STBs in a database;

automatically generating updated software data in response to a change in the desired functionality associated with at least one of the STBs as tracked in the database;

generating the updated software data such that it specifies at least first customized functionality targeting a first identifier and second customized functionality targeting a second identifier different than the first identifier;

generating the updated software data such that, when being utilized to perform media functions by a particular STB, the first customized functionality will only be activated when the particular STB is programmed with the first identifier, and the second customized functionality will only be activated when the particular STB is programmed with the second identifier; and broadcasting the updated software data to the STBs utilizing the RF coax network in order to cause all of the STBs to install the updated software data in their respective non-volatile memories;

wherein the RF coax network provides one-way broadcast-only communication to the STBs such that all of the STBs receive the same updated software data over the RF coax network and cannot acknowledge receipt over the RF coax network.

2. The method of claim 1, wherein:

the updated software data is a same application program that is executed by all of the STBs; and the application program includes a first module targeting the first identifier that is only activated when the application program is executed by one or more STBs programmed with the first identifier, and a second module targeting the second identifier that is only activated when the application program is executed by one or more STBs programmed with the second identifier.

3. The method of claim 1, wherein:

the first customized functionality causes each of the STBs that are programmed with the first identifier to display an interactive program guide (IPG) listing a first set of channels of media content broadcast over the RF coax network; and the second customized functionality causes each of the STBs that are programmed with the second identifier to display an IPG listing a second set of channels of the media content different than the first set.

4. The method of claim 3, further comprising:

tracking channels to list on the respective IPG for each of the STB identifiers in the database; and automatically generating the updated software data and broadcasting the updated software data to the STBs utilizing the RF coax network in response to a change of the channels to list for at least one of the STB identifiers in the database.

5. The method of claim 3, further comprising:

periodically generating updated IPG metadata and broadcasting the updated IPG metadata to the STBs utilizing the RF coax network;

wherein each of the updated IPG metadata specifies the media content that will be broadcast over the RF coax network during an upcoming time period.

6. The method of claim 1, wherein:

the first customized functionality authorizes each of the STBs that are programmed with the first identifier to play a first set of channels of media content broadcast over the RF coax network; and the second customized functionality authorizes each of the STBs that are programmed with the second identifier to play a second set of channels of the media content different than the first set.

7. The method of claim 6, further comprising:

tracking channel authorizations for each of the STB identifiers in the database; and automatically generating the updated software data and broadcasting the updated software data to the STBs utilizing the RF coax network in response to a change of the channel authorizations for at least one of the STB identifiers in the database.

8. The method of claim 1, further comprising:

tracking types of attached media devices for each of the STB identifiers in the database; and automatically generating the updated software data and broadcasting the updated software data to the STBs utilizing the RF coax network in response to a change of type of attached device for at least one of the STB identifiers in the database;

wherein the first customized functionality causes each of the STBs that are programmed with the first identifier to control one or more attached media devices according to a first protocol; and the second customized functionality causes each of the STBs that are programmed with the second identifier to control one or more attached media devices according to a second protocol different than the first protocol.

9. The method of claim 1, wherein:

the first customized functionality causes each of the STBs that are programmed with the first identifier to play a pay-per-view program after receiving a first passkey from a user; and the second customized functionality causes each of the STBs that are programmed with the second identifier to play the pay-per-view program after receiving a second passkey from a user, the second passkey different than the first passkey.

10. A tangible non-transitory computer-readable medium comprising computer executable instructions that when executed by a computer cause the computer to perform the method of claim 1.

11. A hospitality media system comprising:

a plurality of set-top boxes (STBs) coupled to a radio frequency (RF) coax network of a hotel, wherein each of the STBs performs one or more media functions according to software data stored in a non-volatile memory of the STB, each of the STBs is programmed with an identifier stored in the STB's non-volatile memory for identifying the STB, and the identifier of each STB: is changeable, is programmed into the STB when the STB is installed in a room of the hotel, and identifies the STB according to a characteristic of the room of the hotel in which the STB is installed;

a database tracking desired functionality for each of the STBs;

a controller coupled to the database and operable to automatically generate updated software data in response to a change in the desired functionality associated with at least one of the STBs as tracked in the database;

the controller operable to generate the updated software data such that it specifies at least first customized functionality targeting a first identifier and second customized functionality targeting a second identifier different than the first identifier;

the controller operable to generate the updated software data such that, when being utilized to perform media functions by a particular STB, the first customized functionality will only be activated when the particular STB is programmed with the first identifier, and the second customized functionality will only be activated when the particular STB is programmed with the second identifier; and an update server coupled to the controller and the RF coax network;

the update server operable to broadcast the updated software data to the STBs utilizing the RF coax network in order to cause all of the STBs to install the updated software data in their respective non-volatile memories;

wherein the RF coax network provides one-way broadcast-only communication to the STBs such that all of the STBs receive the same updated software data over the RF coax network and cannot acknowledge receipt over the RF coax network.

12. The hospitality media system of claim 11, wherein:

the updated software data is a same application program that is executed by all of the STBs; and the application program includes a first module targeting the first identifier that is only activated when the application program is executed by one or more STBs programmed with the first identifier, and a second module targeting the second identifier that is only activated when the application program is executed by one or more STBs programmed with the second identifier.

13. The hospitality media system of claim 11, wherein:

the first customized functionality causes each of the STBs that are programmed with the first identifier to display an interactive program guide (IPG) listing a first set of channels of media content broadcast over the RF coax network; and the second customized functionality causes each of the STBs that are programmed with the second identifier to display an IPG listing a second set of channels of the media content different than the first set.

14. The hospitality media system of claim 13, wherein the controller is further operable to:
  track channels to list on the respective IPG for each of the STB identifiers in the database; and
  automatically generate the updated software data in response to a change of the channels to list for at least one of the STB identifiers in the database.

15. The hospitality media system of claim 13, wherein:
  the controller is further operable to periodically generate updated IPG metadata for broadcast to the STBs utilizing the RF coax network; and
  each of the updated IPG metadata specifies the media content that will be broadcast over the RF coax network during an upcoming time period.

16. The hospitality media system of claim 11, wherein:
  the first customized functionality authorizes each of the STBs that are programmed with the first identifier to play a first set of channels of media content broadcast over the RF coax network; and
  the second customized functionality authorizes each of the STBs that are programmed with the second identifier to play a second set of channels of the media content different than the first set.

17. The hospitality media system of claim 16, wherein the controller is further operable to:
  track channel authorizations for each of the STB identifiers in the database; and
  automatically generate the updated software data in response to a change of the channel authorizations for at least one of the STB identifiers in the database.

18. The hospitality media system of claim 11, wherein:
  the controller is further operable to track types of attached media devices for each of the STB identifiers in the database, and to automatically generate the updated software data in response to a change of type of attached device for at least one of the STB identifiers in the database;
  the first customized functionality causes each of the STBs that are programmed with the first identifier to control one or more attached media devices according to a first protocol; and
  the second customized functionality causes each of the STBs that are programmed with the second identifier to control one or more attached media devices according to a second protocol different than the first protocol.

19. The hospitality media system of claim 11, wherein:
  the STBs are located in a plurality of guest rooms of the hotel; and
  the controller is operable to automatically generate the updated software data in response to a new guest checking in to one of the guest rooms.

20. A controller for providing customized media functions in a hospitality media system having a plurality of set-top boxes (STBs) coupled to a radio frequency (RF) coax network of a hotel, wherein each of the STBs performs one or more media functions according to software data stored in a non-volatile memory of the STB, each of the STBs is programmed with an identifier stored in the STB's non-volatile memory for identifying the STB, and the identifier of each STB: is changeable, is programmed into the STB when the STB is installed in a room of the hotel, and identifies the STB according to a characteristic of the room of the hotel in which the STB is installed, the controller comprising one or more processors configured to:
  track desired functionality for each of the STBs in a database;
  automatically generate updated software data in response to a change in the desired functionality associated with at least one of the STBs as tracked in the database;
  generate the updated software data such that it specifies at least first customized functionality targeting a first identifier and second customized functionality targeting a second identifier different than the first identifier;
  generate the updated software data such that, when being utilized to perform media functions by a particular STB, the first customized functionality will only be activated when the particular STB is programmed with the first identifier, and the second customized functionality will only be activated when the particular STB is programmed with the second identifier; and
  cause the updated software data to be broadcast to the STBs utilizing the RF coax network in order to cause all of the STBs to install the updated software data in their respective non-volatile memories;
  wherein the RF coax network provides one-way broadcast-only communication to the STBs such that all of the STBs receive the same updated software data over the RF coax network and cannot acknowledge receipt over the RF coax network.

* * * * *